United States Patent [19]

Aoyama

[11] Patent Number: 5,119,415

[45] Date of Patent: Jun. 2, 1992

[54] METHOD OF DISPLAYING CALLED PARTY INFORMATION ON CALLING PARTY TERMINAL AND COMMUNICATION NETWORK USING THE METHOD

[75] Inventor: Takashi Aoyama, Yokohama, Japan

[73] Assignee: Hitachi, Ltd., Tokyo, Japan

[21] Appl. No.: 395,056

[22] Filed: Aug. 17, 1989

[30] Foreign Application Priority Data

Aug. 24, 1988 [JP]   Japan .................. 63-208294

[51] Int. Cl.⁵ ............................................. H04M 3/50
[52] U.S. Cl. .................................... 379/207; 379/213; 379/230
[58] Field of Search ............... 379/201, 207, 210, 213, 379/230, 274, 233, 214

[56] References Cited

U.S. PATENT DOCUMENTS

| | | | |
|---|---|---|---|
| 4,313,035 | 1/1982 | Jordan et al. | 379/230 |
| 4,499,336 | 2/1985 | Krikor et al. | 379/230 |
| 4,660,220 | 4/1987 | Kraus | 379/210 |
| 4,783,796 | 11/1988 | Ladd | 379/212 |
| 4,932,042 | 6/1990 | Baral et al. | 379/230 |
| 4,969,182 | 11/1990 | Ohtsubo et al. | 379/213 |

FOREIGN PATENT DOCUMENTS

| | | | |
|---|---|---|---|
| 0196781 | 10/1986 | European Pat. Off. | 379/89 |
| 0236253 | 10/1986 | Japan | 379/201 |
| 0204557 | 8/1989 | Japan | 379/201 |

Primary Examiner—Jin F. Ng
Assistant Examiner—Wing F. Chan
Attorney, Agent, or Firm—Antonelli, Terry, Stout & Kraus

[57] ABSTRACT

A method of displaying the information on a called party on a calling terminal, and a communication network using this method. In a communication network structuring an inter-station network by using a signalling system capable of transmitting a call control signal including additional information, a user of the called party terminal registers its own information in its exchange beforehand. An activation signal from an originating exchange to a destination exchange is added to a representation indicative of a request type whether a call is made or not made. A call control signal from the destination exchange to the originating exchange, such as an address completion signal, is added to a parameter representative of the registered information. These signals are transmitted between the originating and destination exchanges so that the originating exchange displays the received, registered information of the called party on the calling party terminal.

22 Claims, 6 Drawing Sheets

METHOD OF DISPLAYING CALLED PARTY INFORMATION ON CALLING PARTY TERMINAL AND COMMUNICATION NETWORK USING THE METHOD

BACKGROUND OF THE INVENTION

The present invention relates to communication network service using a signalling system capable of transmitting a call control signal together with additional information, independently from a call. More particularly, the present invention relates to a method of displaying called party information on a calling party terminal and a communication network using the method, suitable for efficient use of circuits.

There is known a common channel signalling system which is one of the communication systems capable of processing a number of call control signals. A common channel signalling system presently used is Signalling System No. 7 recommended by International Consultative Committee in International Telegraphy and Telephony (CCITT). Signalling System No. 7 itself does not have many specifications regarding additional services. As services for an unsuccessful call, there is a service called CCBS (Completion of Calls to Busy Subscriber). As described in CCITT, Red Book, Vol. E VI, Fascicle VI.8 (1984), pp. 80-82, p. 240, CCBS is a so-called callback service. For a user of this service function, if a telephone call is made to a busy subscriber line or a busy extension line, the system calls both the calling and called party after the busy state of the subscriber line or extension line is released. Such a CCBS function is effective only for a busy subscriber line or a busy extension line. In addition to such a busy state, even in the free state of a subscriber line or extension lines, there are, however, other cases where a call is repetitively made in vain, for example if a called party leaves his seat for conference or is out of office for several days.

Further, it can be considered the case where a calling party wishes to confirm the information on a called party such as his name before the calling party makes an actual call. Such service is not provided in Signalling System No. 7.

Similar problems are associated with Integrated Services Digital Network (ISDN), although this network can process a number of call control signals.

Japanese Patent Laid-open Publication JP-A-62-263743 discloses the technology wherein means is provided for storing a transfer telephone number for dealing with an absence of a user of an extension telephone so that call reception is switched to the transfer destination. This technology however does not solve the above-described problems.

A technology associated with a private branch exchange (PBX) is disclosed in U.S. patent application Ser. No. 07/381,190 filed on Jul. 18, 1989, now U.S. Pat. No. 4,969,182 by the same assignee, claiming the priority right based on Japanese Patent Application Serial No. 63-178233 filed on Jul. 19, 1988. According to this technology, there is disclosed a call set-up system wherein the information on a subscriber such as out-of office, attending conference and the like, is stored in PBX, and upon reception of a call, a sound (talkie) audible for a user of a calling party extension line is generated without connecting the called party extension line. This system, however, is not concerned with communications among a plurality of exchanges.

SUMMARY OF THE INVENTION

In the above-described prior art, even if a user of a called party terminal is out of office or leaves his seat for attending a conference, the calling party cannot know it causing the calling party to try the call several times to eventually assume that the called party is not present and to disconnect the line upon off-hook. The calling party who does not know the circumstances of the called party makes a call thereafter in vain. With such wasteful calls, the circuit is made busy thus hindering an effective use of circuits. If the information on a called party such as his absence were sent from an exchange to the calling party upon reception of a call, then it would be possible to avoid such inconvenience and eliminate such wasteful use of circuits, and to improve communication service ability. However, the technology improving such communication serviceability was not developed as yet and was left as a future issue.

It is an object of the present invention to provide a method of displaying the called party information such as his absence, the information being supplied from the destination exchange to the originating exchange after reception of a call at the destination exchange.

It is another object of the present invention to provide a method of displaying the called party information on a calling party terminal, the information being returned from the destination exchange without accessing the called party terminal.

It is a further object of the present invention to provide a communication network capable of supplying the called party information such as an absence of a called party, from the destination exchange to the calling party terminal after reception of a call at the destination exchange.

According to one aspect of the present invention the above objects are achieved in a communication network structuring an inter-exchange network by using a signalling system capable of transmitting a call control signal independently from a call. The information on a user of a called party terminal inputted therefrom is registered at an exchange in service for the called party terminal. The exchange adds, upon reception of an arrived call from another exchange, a parameter representative of the registered information to a call control signal and sends the call control signal with the parameter back to the another exchange. The another exchange causes, upon reception of the call control signal with the parameter, a calling party terminal which is serviced by the another exchange and from which the arrived call was originated, to display thereon the information on the called party represented by the parameter.

According to another aspect of the present invention, there is provided a communication network structured by an inter-exchange network by using a signalling system capable of transmitting a call control signal independently from a call, wherein the information on a user of a called party terminal inputted therefrom is registered at an exchange in service for the called party terminal. A representation indicative of a request type, indicating whether a call to the called party terminal is to be made or not, is added to an activation signal from another exchange to the exchange in service for the called party terminal. The exchange in service for the called party terminal adds, upon reception of the activation signal added to the representation indicative of the request type, a parameter representing the information on the called party to the call control signal and sends the call control signal added to the parameter back to the another exchange. The exchange in service for the called party terminal makes a call to the called party or does not make in accordance with the request type. The another exchange causes, upon reception of the call control signal added with the parameter, a terminal equipment which is serviced by the another exchange and from which the activation signal was originated, to display thereon the information on the called party without accessing the called party terminal.

If a called party is not present and cannot respond to a call, the registered information on the called party is supplied from a destination exchange to the calling party terminal and displayed thereon. If a called party is attending a conference and the return time and the like have been registered, the notice that the called party is attending a conference and the return time are displayed on the calling party terminal, and thereby permitting the calling party to know the circumstances of the called party and the time the called party can be later contacted, thus avoiding wasteful repetitive calls. The effective use of circuits can further be improved by automatically disconnecting and releasing (make free) the communication circuit which has been established between the calling and called parties.

Further, the serviceability of the system improves because the called party information such as his name and office department can be obtained, without accessing the called party terminal.

DESCRIPTION OF THE PREFERRED EMBODIMENTS

Preferred embodiments of the present invention will be described with reference to the accompanying drawings.

Figure 1:
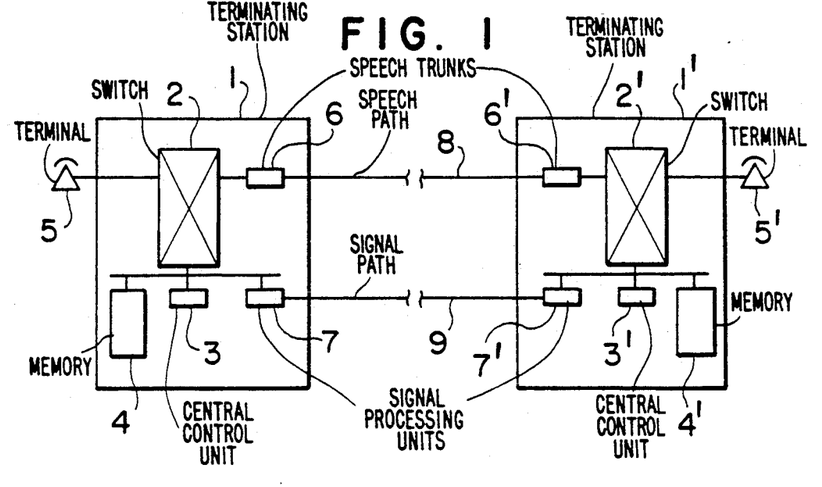
FIG. 1 is a schematic diagram showing a communication network capable of displaying the called party terminal information according to an embodiment of this invention.

FIG. 1 shows the structure of a system which uses the method of displaying the called party terminal information according to an embodiment of this invention. In FIG. 1, reference numerals 1 and 1' represent originating and terminating stations, 2 and 2' switches, 3 and 3' central control units, 4 and 4' memories, 5 and 5' calling and called party terminals such as telephone set, facsimile or data terminal, 6 and 6' speech trunks, 7 and 7' common channel signalling processing units, 8 a speech path, and 9 a control signal path. Each common channel signalling processing unit 7, 7' has a function to select a line and send via the selected line a control signal generated at its own central control unit 3, 3', and to pass a control signal from another exchange to its own central control unit 3, 3', and other functions. The units described above are the logical structure realizing the main portion of exchanges interconnected by using the common channel signalling system. There are other general units constituting the exchanges, such as external storages, maintenance terminals. These units are not directly related to the present invention, so they are omitted in FIG. 1. As an example of implementation of the signal path 9, there is a case where the common channel signal is physically inserted in the speech path 8. In logical sense of view, however, it is apparent that common channel signalling units are connected to exchanges as shown in FIG. 1. This is also true for a network wherein exchanges are interconnected by a higher hierarchy network such as a public network via ISDN interfaces.

Figure 2:
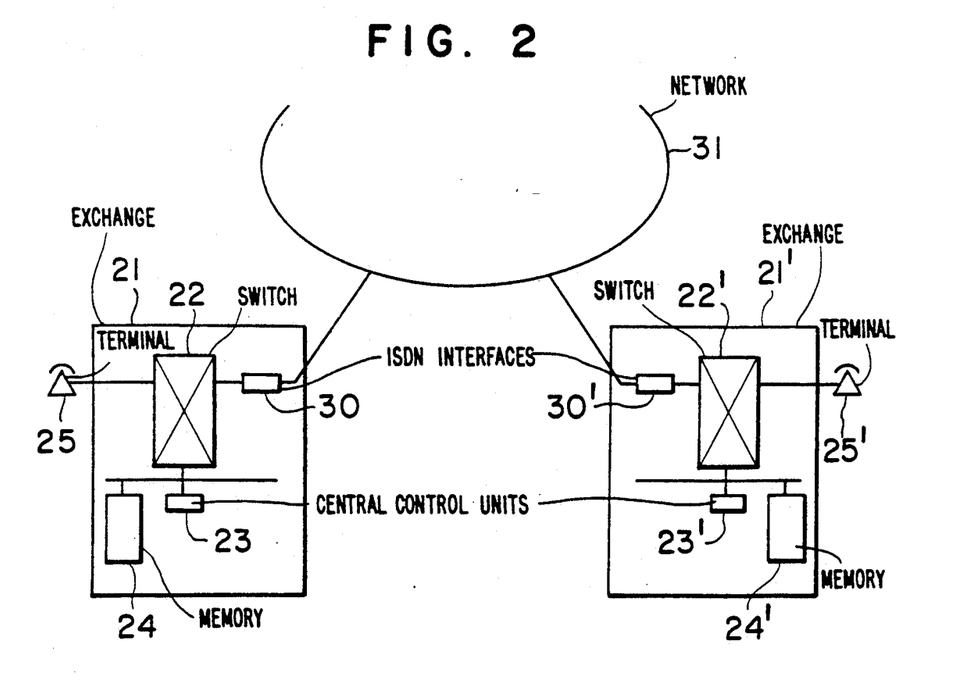
FIG. 2 is a schematic diagram showing a communication network capable of displaying the called party terminal information according to another embodiment of this invention.

FIG. 2 shows an example of a communication network wherein switches are interconnected by a higher hierarchy network via ISDN interfaces. In FIG. 2, reference numerals 21 and 21' represent originating and destination exchanges, 22 and 22' switches, 23 and 23' central control units, 24 and 24' memories, 25 and 25' calling and called party terminals, 30 and 30' ISDN interfaces, and 31 a higher hierarchy network. In the case where the format of a signal supplied from the higher hierarchy network 31 has a function to transparently transfer user information, the exchanges 21 and 21' can mutually transfer extended information (of this invention, to be described later) added to a call control signal. Consequently, the communication network wherein switches are interconnected by a higher hierarchy network such as a public network via ISDN interfaces, is equivalent to the communication network using Signalling System No. 7, so that the present invention can also be applied to such a network.

The following description of the embodiments of this invention is directed to the communication network using the common channel signalling system by way of example.

Figure 3:
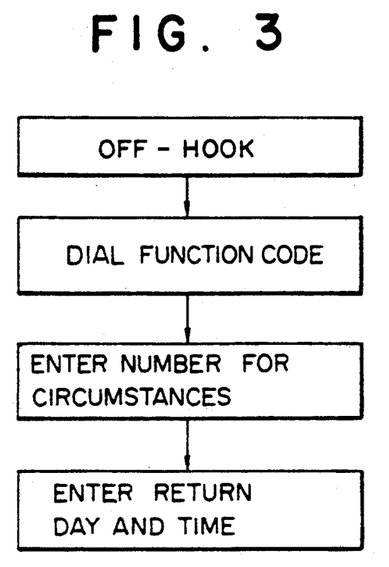
FIG. 3 is a flow chart showing the procedure of registering information from the terminal shown in FIG. 1.

Referring back to FIG. 1, the terminals 5 and 5' in this embodiment each are a multi-function telephone set having a function of a liquid crystal display. It is assumed now that a user (called party) of the terminal 5' leaves his seat for attending a conference. As shown in FIG. 3, a user of the terminal 5' first hooks off the handset to enter a function code for initiating a mode for setting terminal user circumstances. Thereafter, a number representative of the user circumstances is dialed.

For example, a number "1" is dialed for the circumstances of "Attending Conference" to register the circumstances at the associated exchange. Succeedingly, the return day and time are dialed in. If a message (response message) is also to be prepared, a message setting mode is set by entering a function code therefor. Then, a proper message is selected from several predetermined fixed messages by dialing the number for that message. Information specific to the terminal, such as the name and office department of the user of the terminal may be inputted through, for example, the maintenance terminal. Since the circumstances or messages of the terminal user are registered by using specific numbers, they can be sent to the destination exchange in the form of numbers instead of the circumstances or messages themselves, and displayed after converting the numbers into text data stored in the memory 4.

Figure 4:
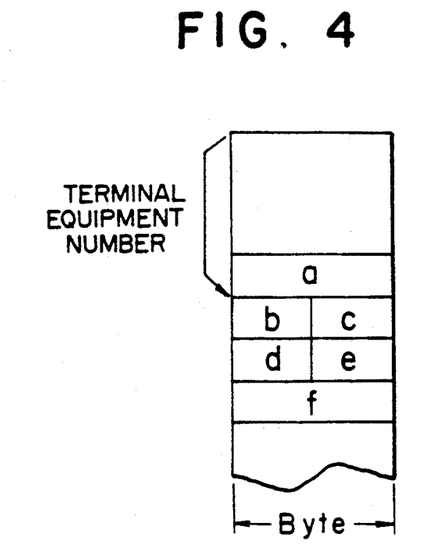
FIG. 4 shows the format of a memory shown in FIG. 1 in which information is stored.

The information on the called party supplied from the terminal 5' is registered in the memory 4' in the exchange 1'. The format of the information stored in the memory 4' is shown in FIG. 4. In the specific area of the memory 4' for the terminal 5', the numbers a, b, c, d, e and f are registered. The user circumstances number a representative of the called party circumstances is "1" for "Attending Conference" in the above example. The numbers b, c, d and e represent a return month, day, time and minute, respectively. The number f represents a response message.

Figure 5:
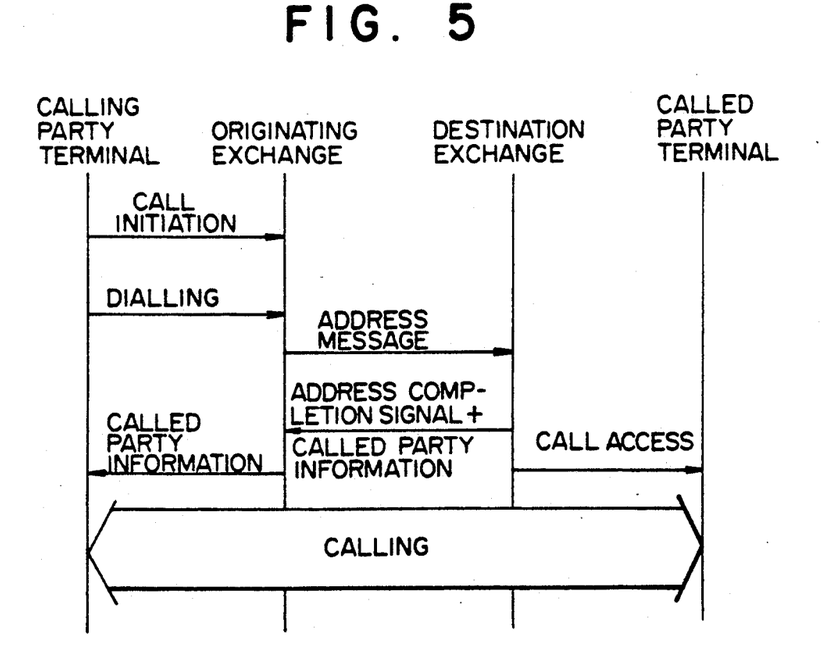
FIG. 5 is a sequential diagram showing a connection procedure according to an embodiment of the method of displaying the called party terminal information according to this invention.

FIG. 5 is a sequential diagram illustrating the connection procedure for making a telephone call from a user of the terminal 5 to a user of the terminal 5'. First, a user of the calling party 5 under service by the originating exchange 1 initiates a call by dialing the access number to the called party 5' under service by the exchange 1'. The originating exchange 1 receives this dialing from the terminal 5, and if it acknowledges, based on the access number, a connection request to the destination exchange 1', then the originating exchange 1 sends to the destination exchange 1' an address message (activation signal, arrived call) of a reception request to the terminal 5'.

At the destination exchange 1', the central control unit 3' determines the called party terminal equipment 5' based on the address message. In accordance with whether the called party is busy or free, and in accordance with whether a call control signal (to be described later) designates a call to the called party or a disconnection of its speech path, the destination exchange 1' analyzes if a call is allowed to be received or not. If a call is allowed to be received, an address completion signal is sent to the destination exchange 1, and if a call is not allowed, an unsuccessful backward set-up signal (disconnection signal) is sent back to the originating station 1. In this case, the registered information on the called party is added to the address completion signal or unsuccessful backward set-up signal each constituting the call control signal, in the following manner. First, the central control unit 3' at the destination station 1' checks if the user of the called party terminal 5' has registered his information. If the information has been registered, it is read out and set in the form of parameter at the address completion signal or unsuccessful backward set-up signal, as shown in FIGS. 6 and 7.

Figure 6:
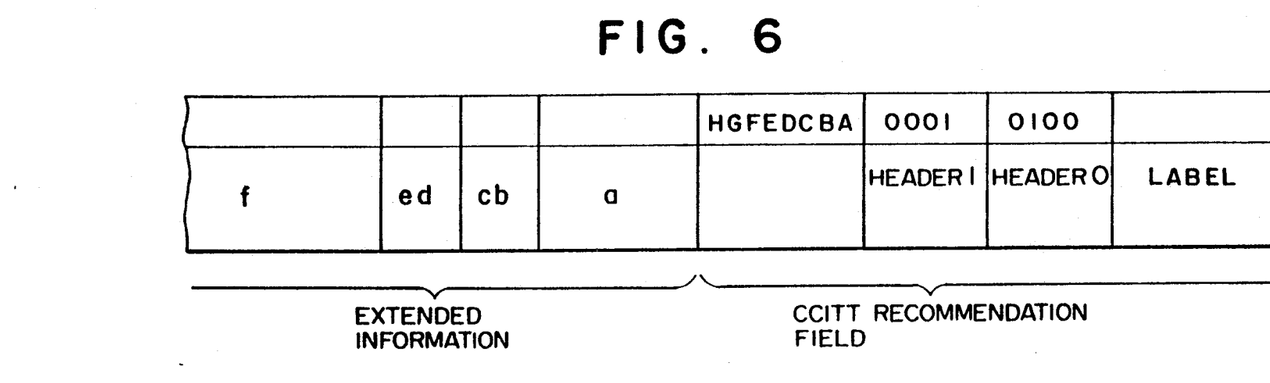
FIG. 6 shows the format of an address completion signal added with extended information.

FIG. 6 shows the parameter format of an address completion signal. In the signal representation field conforming with the CCITT Recommendation, the bit H is used for the definition whether extended information is present or not. In the above example, since the extended information, that is, the registered information of the called party, is present, the bit H is set at "1". If it is not present, the bit H is set at "0". In the extended information, the reason of absence of the called party is represented by eight bits of a, the return month, day, time and minute are represented by eight bits ×4 of b, c, d, and e, and the message text size and text are represented by eight bits and eight bits × n of f, respectively using specifically allocated numbers. The numbers b, c, d, and e each are represented by eight bits the same as the number a. However, in FIG. 6, the field of each number b, c, d, e is depicted in a reduced scale for convenience in making the drawing. The detail of the address completion signal in the CCITT Recommendation field is described in "Signalling System No. 7" at page 33.

Figure 7:
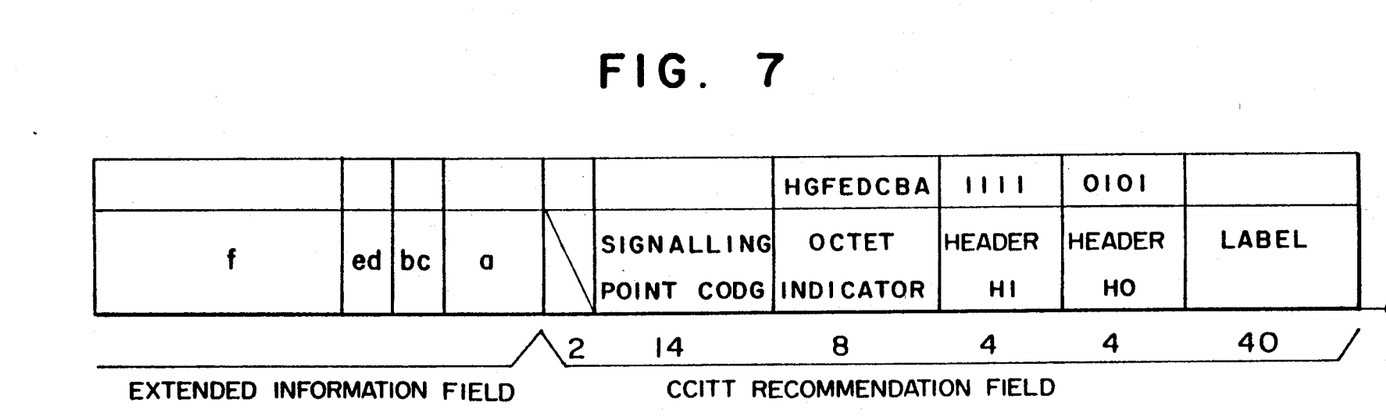
FIG. 7 shows the format of an unsuccessful backward set-up information message (EMU) added with extended information according to the present invention.

FIG. 7 is related to a pattern format of an unsuccessful call backward set-up signal (UBM). As a particular example of this signal, there is shown an extended unsuccessful call backward set-up information message (EUM) added with the information on a called party. Similarly to FIG. 6, in the signal representation field conforming with the CCITT Recommendation, the bit H is used for the definition of whether extended information is present or not. If the extended information, that is, the registration information of the called party, is present, the bit H is set at "1". If there is not present, the bit H is set at "0". The extended information field is similar to that shown in FIG. 6, so the description therefor is omitted.

Although the detail of the EUM format is described in "Signalling System No. 7" at page 35, a brief description will be given herein. The bits D, C, B and A of an octet indicator shown in FIG. 7 are an unsuccessful indicator, which represent a "spare" for 0000, a "subscriber busy" for 0001, an absence for 0010 although CCITT Recommendation represents a spare for this code, and a "spare" for 0010 to 1111. The bits H, G, F and E represent a "spare". According to the present invention, however, the bit H is used for the representation of whether registered information is present or not, as described previously.

Figure 8:
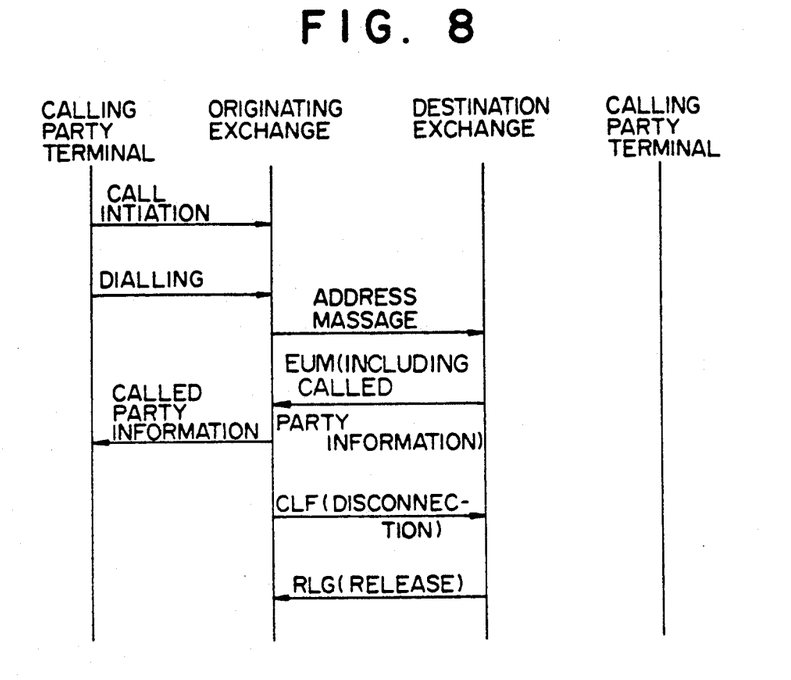
FIGS. 8 and 11 are sequential diagrams showing other embodiments of this invention.

FIG. 8 shows the sequential diagram illustrating the connection procedure for an unsuccessful call. In this case, the destination exchange sends to the originating exchange the EUM with the called party information added thereto. The originating exchange causes the calling party terminal to display the obtained called party information. Next, the originating exchange sends a clear forward message CLF to the destination exchange to release (make free) the circuit. After confirming the release, the destination exchange sends back a release guard message RLG to the originating exchange.

Figure 9:
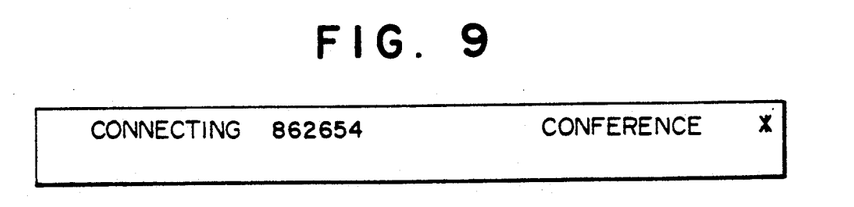
FIG. 9 shows a display example.

Upon reception of the address completion signal or unsuccessful backward set-up signal, the originating station 1 checks the extended information and displays it on the calling party terminal 5. In a display example shown in FIG. 9, the display area includes a call circumstances display are (represented as CONNECTING (under connection) in FIG. 9) of twelve columns, a dial monitor display area (represented as 862654 in FIG. 9) of fourteen columns, a called party circumstances name display area (represented as CONFERENCE (attending a conference) in FIG. 9) of six columns, and a detail information presence display area (represented as * in FIG. 9) of one column. If the detail information is to be displayed, a predetermined operation is carried out to display a return day and time. In FIG. 9, the length of each area is not proportional to the number of columns for convenience in making the drawing.

Figure 10:
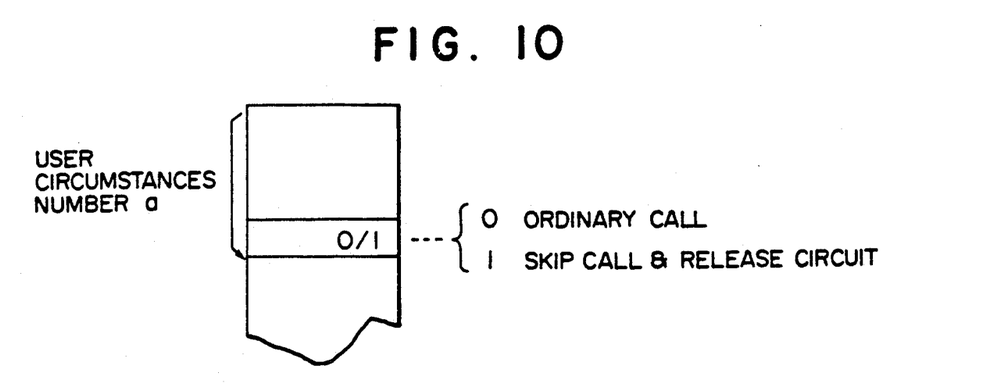
FIG. 10 shows a table for use in selecting either an actual call or a circuit release in accordance with the called party circumstances.

Depending upon the circumstances of the user of the called party terminal 5', either the address completion signal is returned to maintain a calling state, or the unsuccessful backward set-up signal is returned not to maintain the calling state but to disconnect the speech path between the originating and destination exchanges. Such operation can be selectively determined, for example, in accordance with the data shown in FIG. 10. One bit in the user circumstances number a shown in FIG. 10 is set at "1" or "0". For example, if the bit is "1", standing for leaving a seat, then a call reception is acknowledged, whereas if the bit is "0", standing for being out of office, then the speech path between stations is disconnected to avoid wasteful calls, to thereby effectively use circuits.

Next, another embodiment of this invention will be described with reference to FIGS. 11 and 12.

In this embodiment, the information on a called party can be read without accessing the called party (called party terminal).

Figure 11:
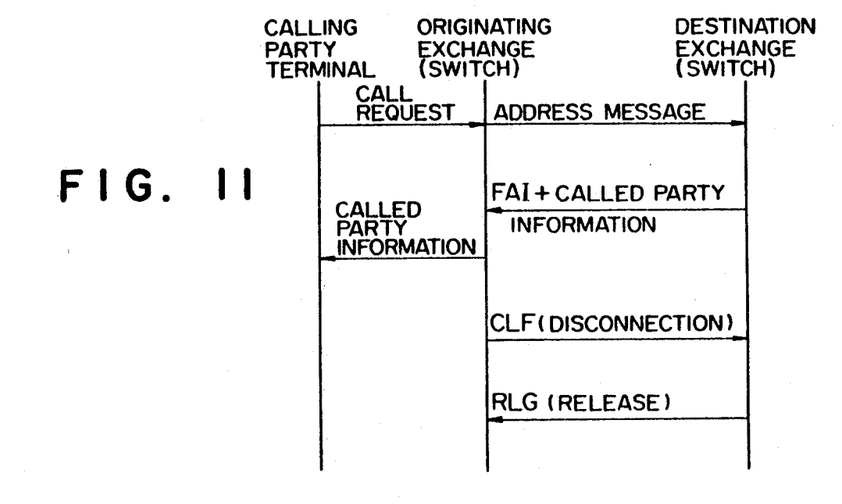

Referring to FIG. 11, prior to dialing, a calling party uses a specific function code to notify the originating exchange of the fact that only the information on the called party terminal is requested without accessing the called party terminal. The originating exchange then sends to the destination exchange an address message (activation signal) added with the extended information, i.e., a parameter requesting only the called party terminal information without accessing the called party. This parameter is added in accordance with this invention. Upon reception of this parameter, the destination exchange sends back to the originating exchange a facility information (FAI) to be described later while adding thereto the called party terminal information. The called party terminal information is added in accordance with this invention. Next, the originating exchange causes the calling party terminal to display the obtained called party terminal information. Thereafter, the clear forward message CLF is sent from the originating exchange to the destination exchange to release (make free) the circuit. After confirming the release, the destination exchange sends to the originating exchange the release guard message RLG.

Figure 12:
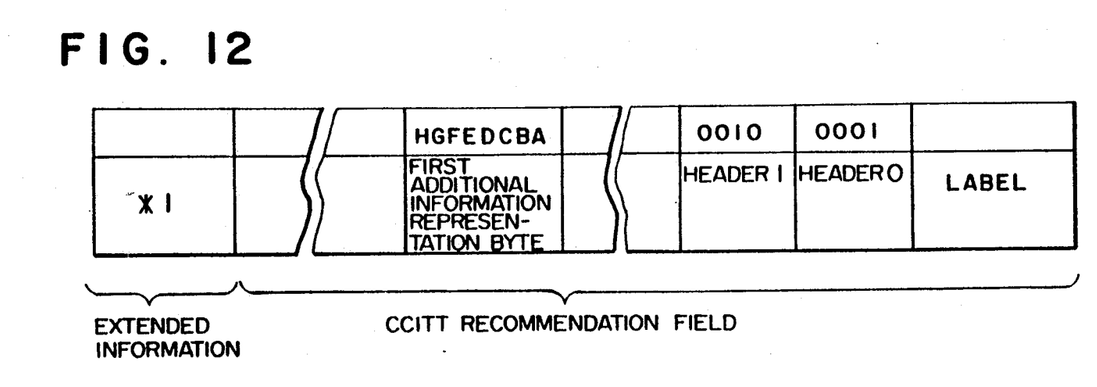
FIG. 12 shows the parameter format of an address message.

FIG. 12 shows the parameter format of an address message. Of the first additional information representation byte (bits A, B, C, D, E, F, G and H) in the CCITT Recommendation field, the bit H is used for the definition of whether or not there is an extended information. For example, if the extended information is present, the bit H is set at "1", whereas if not, it is set at "0". The facility information for such extended information is assigned eight bits. If the bit H is "0", an ordinary call is effected, whereas if the bit H is "1", the called party terminal information only is requested to be read out without accessing the called party terminal. The remaining bits 2 to 255 stand for a "spare".

Figure 13:
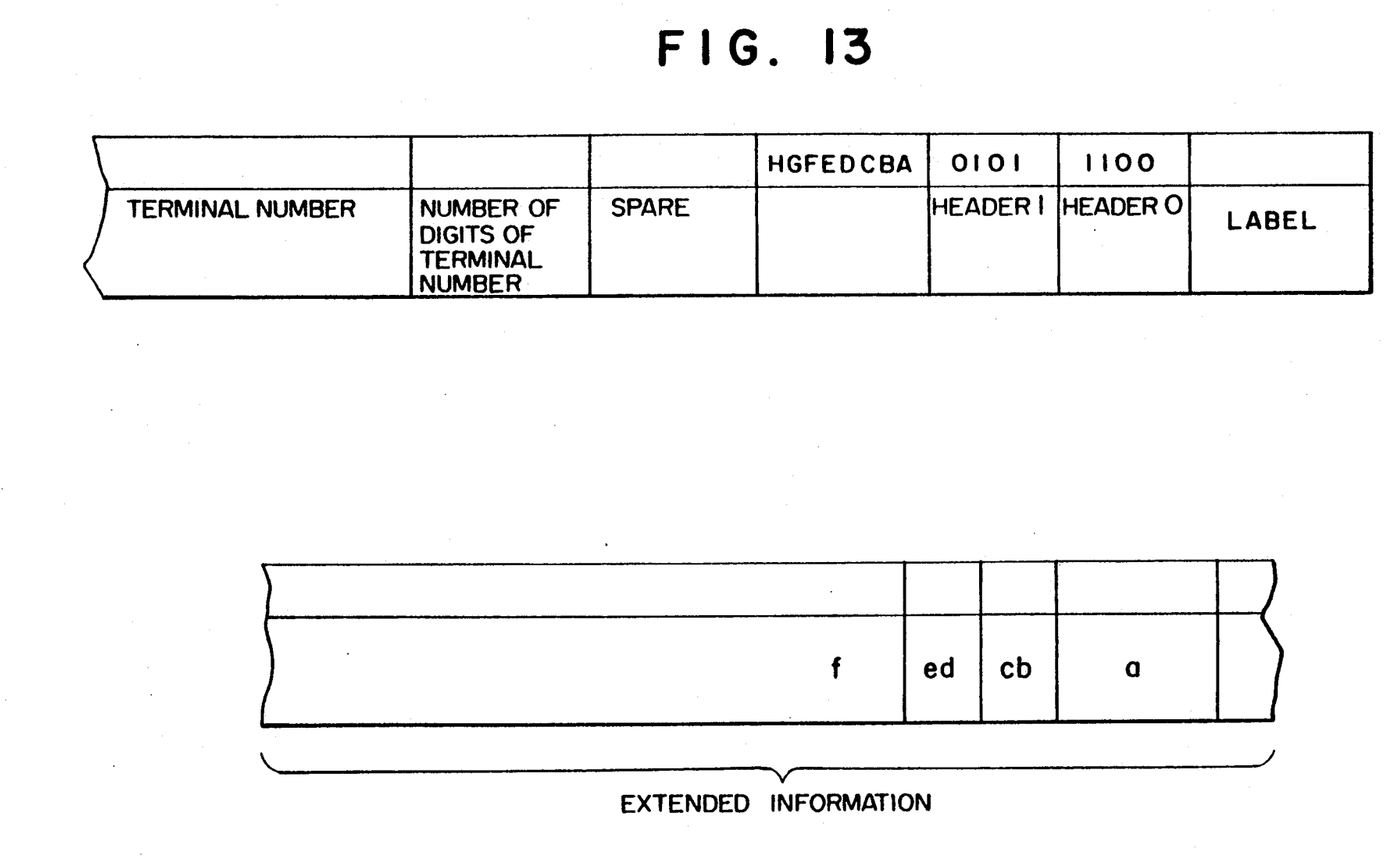
FIG. 13 shows the parameter format of FAI.

FIG. 13 shows the parameter format of FAI added in accordance with the present invention, using one of portions defined as a national option in "Telephone User Part" of CCITT No. 7. In this case, a portion having Header 0 of 1100 and Header 1 of 0101 is used as FAI. The bit H in the signal representation field within the CCITT Recommendation field is used for the definition of whether or not there is extended information (inter-network call information). As previously described, the bit H is set at "1" if the extended information, that is, the registration information on a called party, is present, and set at "0" if not. Similarly to that shown in FIG. 6, of the extended information, the reason of absence of the called party is represented by eight bits of a, the return month, day, time and minute are represented by eight bits $\times 4$ of b, c, d, and e, and the message text size and text are represented by eight bits and eight bits $\times$ n of f, respectively using specifically allocated numbers. The name, office department and the circuit of a user of the called party terminal may be registered in the message text. A brief explanation of the CCITT Recommendation field will be given. The $H_0$ (Header 0) field indicates that a heading code is represented by $H_0$, and the $H_1$ (Header 1) field indicates that a heading code is represented by $H_1$. The inter-network call information display field is made of one byte, the bits A to G being used as a spare, and the bit H being used for indicating whether there is inter-network call information. The terminal number digit field is made of one byte to represent the number of digits of the terminal number (extension number). The terminal number field is made of three bytes to represent the terminal number (extension number). The terminal number digit field and terminal number filed are specific to FAI Upon reception of FAI with the called party information added thereto, the calling party terminal can display the called party information without actually accessing the called party terminal.

In the above-described embodiments, a telephone set is used as an example of a terminal. It is obvious however that other types of terminals such as facsimile, data terminal and the like may be applied to this invention.

According to the present invention, if a user of a terminal is not present, the absence of the user, its reason, expected return time, or the like can be informed to the calling party, to thereby avoid waste time which might otherwise be consumed by a calling party, enabling effective usage of circuits.

Further, a service for obtaining the information on a called party without accessing the called party terminal becomes possible, which has been not available with a conventional technique.

I claim:

1. A method of displaying information of a user of a called party terminal on a calling party terminal, in a communication network structuring an inter-exchange network by using a signalling system capable of transmitting a call control signal independently from a call, said method comprising the steps of:

previously registering a parameter in a first exchange in service for a first terminal, said parameter corresponding to a message representative of information regarding a user of said first terminal, said message being selected from a plurality of predetermined fixed messages in response to an inputting operation on said first terminal;

receiving in said first exchange an arrived call sent from a second terminal serviced by a second exchange and a call control signal sent by said second exchange;

adding in said first exchange, upon reception of said arrived call, said registered parameter regarding said first terminal to said call control signal and transmitting said call control signal including said parameter to said second exchange;

reading into said second exchange, upon reception of said call control signal including said parameter, a message from memory corresponding to said parameter and sending said message to said second terminal from which said arrived call was originated; and displaying by said second terminal, upon reception of said message, said received message;

2. A method according to claim 1, further comprising the steps of:

analyzing in said second exchange, upon reception by said second exchange of said call control signal including said parameter, whether or not said first terminal received said call; and automatically disconnecting, if said call has not been received, a communication circuit established between said first and second exchanges to thereby make free said communication circuit.

3. A method according to claim 2, wherein said parameter includes a reception enable/disabled parameter indicating whether said first terminal is called or not, and said analyzing step includes a step of checking said reception enabled/disabled parameter.

4. A method according to claim 1, wherein said previously registering step includes the steps of:

inputting numbers each corresponding to a respective content of one of a plurality of items constituting said message; and storing said message in response to said previously registering step.

5. A method according to claim 4, wherein said plurality of items include a reason of absence of said user, and a return month, day, time and minute.

6. A method of displaying information regarding a user of a called party terminal on a calling party terminal, in a communication network structuring an inter-exchange network by using a signalling system capable of transmitting a call control signal independently of a call, the method comprising the steps of:

inputting to a first terminal information regarding a user of a first terminal, said information being in a first form transmittable by means of a call control signal;

registering in a first exchange in service of said first terminal said information in the first form into storing means in said first exchange, in response to said inputting step;

receiving in said first exchange an arrived call and a call control signal from a second exchange, said arrived call being sent from a second terminal serviced by said second exchange and said call control signal being generated by said second exchange;

upon reception of said arrived call in said first exchange, affixing said registered information in the first form regarding the first terminal to said call control signal and transmitting said call control signal including said information to said second exchange;

upon reception of said call control signal including said information in the first form from said first exchange in said second exchange, converting said information in the first form into information in a second form suitable to a display function of said second terminal;

transmitting in said second exchange said converted information in the second form to said second terminal which generated said arrived call; and upon reception of the converted information in the second form in said second terminal, displaying the received information in said second form.

7. A method of displaying the information of a user of a called party terminal on a calling party terminal, in a communication network structuring an inter-exchange network by using a signalling system capable of transmitting a call control signal independently from a call, said method comprising the steps of:

previously registering first information on a user of a first called party terminal in a first exchange in service for said first terminal, in response to inputting of said first information to said first called party terminal;

adding, upon reception by said first exchange of an arrived call and call control signal from a second exchange, a parameter representative of said registered first information to said call control signal and sending said call control signal added with said parameter back to said second exchange;

causing, upon reception by said second exchange of said call control signal with said parameter, a second terminal serviced by said second exchange from which said arrived call was originated, to display thereon said first information represented by said parameter; and adding second information to said arrived call, when generating said arrived calls in said second exchange, said second information requests said first exchange to add said parameter to said call control signal and send said call control signal including said parameter to said second exchange without accessing said first terminal to thereby display on said second terminal a predetermined fixed message based on said parameter without accessing said first terminal.

8. A method of displaying information of a user of a called party terminal in a communication network structured by an inter-exchange network by using a signalling system capable of transmitting a call control signal independently from a call, said method comprising the steps of:

previously registering first information of a user of a first terminal in a first exchange in service for said first terminal in response to inputting of said information to said first terminal;

adding, by a second exchange, second information indicative of a request type requesting whether a call to said first terminal is to be made or not to an activation signal thereby forming a call control signal to be sent from said second exchange to said first exchange;

adding, upon reception by said first exchange of said activation signal including said second information indicative of the request type, a parameter representative of said previously registered first information to said call control signal, sending said call control signal added with said parameter back to said second exchange and making or not making a call to said first terminal in accordance with said request type; and displaying, upon reception by said second exchange of said call control signal including said parameter, said first information represented by said parameter, on a second terminal which is serviced by said second exchange and from which said actuation signal was originated.

9. A communication network comprising:

at least two exchanges each in service for at least one terminal including a display;

a transmission line for interconnecting said exchanges and transmitting independently a call and a call control signal between said exchanges;

each of said exchanges including:

a switch connected between said transmission line and terminal, a central control unit connected to said switch, a memory connected to said central control unit and a processor connected to said central control unit and said transmission line for transferring said call control signal between said central control unit and said transmission line;

each of said central control units including:

means for registering through a terminal a parameter representing first information on a user of said terminal belonging to said central control unit in said memory, said first information being selected from a plurality of fixed messages, and means responsive to an arrived call for adding a signal corresponding to said parameter representing said first information to said call control signal and sending said call control signal including said signal to an exchange from which said arrived call was originated;

means, responsive to said call control signal including said signal, for reading out from said memory a message corresponding to the received parameter; and means for sending out said message to a terminal from which said arrived call was originated;

wherein the display of the terminal from which said arrived call was originated displays said message received from the exchange to which said terminal belongs.

10. A communication network comprising:

at least two exchanges each in service for at least one terminal including a display;

a transmission line for interconnecting said exchanges and transmitting independently a call and a call control signal between said exchanges;

each of said exchanges including:

a switch connected between said transmission line and said terminal; a central control unit connected to said switch; a memory connected to said central control unit; and a processor connected to said central control unit and said transmission line for transferring said call control signal between said central control unit and said transmission line;

said central control unit including:

means for registering first information on a user of a terminal belonging to said central control unit in said memory from said terminal; and means responsive to an arrived call for adding a parameter representing said first information to said call control signal and sending said call control signal added with said first information to the exchange from which said reception set-up call was originated;

wherein said first information on said user is displayed on said display of said terminal from which said arrived call was initiated, in accordance with said parameter; and wherein each one of said exchanges further includes:

adding means for adding, when one exchange generates said arrived call to another exchange, second information to said arrived call for requesting said another exchange to add said first information to said call control signal and sending said call control signal with said first information added thereto to said one exchange without accessing a called party terminal belonging to said another exchange to thereby display sad first information on a calling party terminal from which said arrived call was initiated without accessing said called terminal.

11. A method of displaying information of a user of a called party terminal on a calling party terminal, in a communication network structuring an inter-exchange network by using a signalling system capable of transmitting a call control signal independently from a call, said method comprising the steps of:

accessing a first exchange from a first terminal serviced by said first exchange and, in response to a dialing operation, selecting from a plurality of predetermined fixed messages a message representing information of a user of said first terminal serviced by said first exchange;

previously registering in said first exchange a parameter corresponding to said message selected in response to said dialing operation;

receiving in said first exchange an arrived call and a call control signal destined to said first terminal and sent from a second terminal serviced by a second exchange;

upon reception of said arrived call in said first exchange affixing said registered parameter to said call control signal and transmitting said call control signal with said parameter affixed thereto to said second exchange;

in response to reception of said call control signal including said parameter in said second exchange, reading out from previously registered predetermined fixed messages a registered message corresponding to said parameter and transmitting the registered message to said second terminal from which said arrived call was originated; and displaying said transmitted registered message on said second terminal.

12. A displaying method according to claim 11 further comprising the steps of:

upon reception of said call control signal including said parameter in said second exchange, carrying out an analysis to determine whether said first terminal accepted a call or not; and when said first terminal does not accept the call, automatically disconnecting a communication circuit established between said second terminal and said first terminal to thereby make free said communication circuit.

13. A displaying method according to claim 12, wherein said parameter includes a reception enable/disabled parameter indicating whether said first terminal is called or not, and said analyzing step includes a step of checking said reception enabled/disabled parameter.

14. A method according to claim 11, wherein each of said plurality of predetermined fixed messages is constituted by a plurality of items and said selecting step includes performing a dialing operation for each item.

15. A method according to claim 14, wherein said plurality of items includes a reason of absence of said user and a return month, day, time and minute.

16. A method according to claim 11, further comprising the step of:

adding a representation to said arrived call, when generating said arrived call said representation requests said first exchange to add said parameter to said call control signal and send said call control signal including said parameter to said second exchange without accessing said first terminal to thereby display on said second terminal a predetermined fixed message based on said parameter without accessing said first terminal.

17. A communication network comprising:
a first exchange in service for a plurality of first terminals each having a display unit;
a second exchange including a plurality of second terminals; and
a transmission path for interconnecting said exchanges to allow a call and a call control signal to be transmitted independently of each other between said exchanges,
wherein said first exchange comprises:
means, responsive to a call, generated from a first terminal serviced by said first exchange, which is destined to a second terminal serviced by said second exchange, for transmitting an address message to said second exchange to indicate the generation of the call by means of said call control signal,
means for storing in an associated manner a plurality of predetermined fixed messages and parameters each corresponding to respective fixed message,
means for receiving an address completion signal and a parameter which are, in response to the generation of the call, returned from said second exchange by means of said call control signal,
means for reading out of said storing means a fixed message designed by the received parameter, and
means for transmitting the fixed message read to the calling party terminal; and
wherein said second exchange comprises:
means responsive to inputting of a parameter from a second terminal serviced by said second exchange, for storing in an associated manner, the terminal through which said parameter was inputted and said inputted parameter, and
means for, in response to reception of the address message from said first exchange, reading out from said storing means a parameter corresponding to a designated called-party terminal and returning said parameter, together with an address completion signal, to said first exchange by means of said call control signal;
wherein the display unit of the calling party terminal displays the received message sent from said first exchange.

18. A communication network according to claim 17, wherein each of said plurality of predetermined fixed messages is constituted by a plurality of items and said parameter designates a combination of said plurality of items.

19. A communication network according to claim 18, wherein said plurality of items includes a reason of absence of said user and a return month, day, time and minute.

20. An exchange which serves for a plurality of terminals each having a display unit and being connected to another exchange via a transmission path which allows a call and a call control signal to be transmitted independently of each other, comprising:
first storing means for storing in an associated manner a plurality of predetermined fixed messages and parameters each corresponding to respective predetermined fixed message;
second storing means responsive to inputting of parameters through terminals serviced by the exchange, for storing in an associated manner the terminals through which said parameters were inputted and the inputted parameters;
means, responsive to reception from said another exchange of an address message sent by means of said call control signal, for reading out from said second storing means a parameter corresponding to a designated called party terminal serviced by the exchange and returning the parameter read, together with an address completion signal, to said another exchange by means of said call control signal;
means responsive to generation of a call generated from a calling party terminal serviced by the exchange and destined to another terminal serviced by said another exchange, for transmitting to said another exchange an address message by means of the call control signal to inform said another exchange of said call generation; and
means for receiving a parameter which is returned, in response to said call generation, from said another exchange, together with an address completion signal, returned by means of said call control signal, reading out from said first storing means a message designated by said parameter received and transmitting the message read to said calling party terminal.

21. A method of displaying information regarding a user of a called party terminal on a calling party terminal, in a communication network structuring an inter-exchange network by using a signalling system capable of transmitting a call control signal independently of a call, the method comprising the steps of:
inputting to a first terminal information regarding a user of said first terminal, said information being in a form transmittable by means of a call control signal;
registering in a first exchange in service for said first terminal said information in storing means in said first exchange in response to said inputting step;
receiving in said first exchange an arrived call and call control signal sent from a second exchange to said first terminal, said arrived call being generated by a second terminal serviced by said second exchange;
upon reception of said arrived call in said first exchange, affixing said registered information regarding the first terminal to said call control signal and transmitting said call control signal with said information affixed thereto to said second exchange;
upon reception of said call control signal including said information from said first exchange in said second exchange, transmitting said information to said second terminal which generated said arrived call; and
upon reception of said information in said second terminal, displaying the received information.

22. A method according to claim 21, further comprising the steps of:
upon reception of said call control signal including said information in the first form in said second exchange, carrying out an analysis to determine whether said first terminal accept said arrived call; and
automatically disconnecting, when said arrived call is not accepted, a communication circuit established between said first and second exchanges to thereby make free said communication circuit.

* * * * *